United States Patent Office

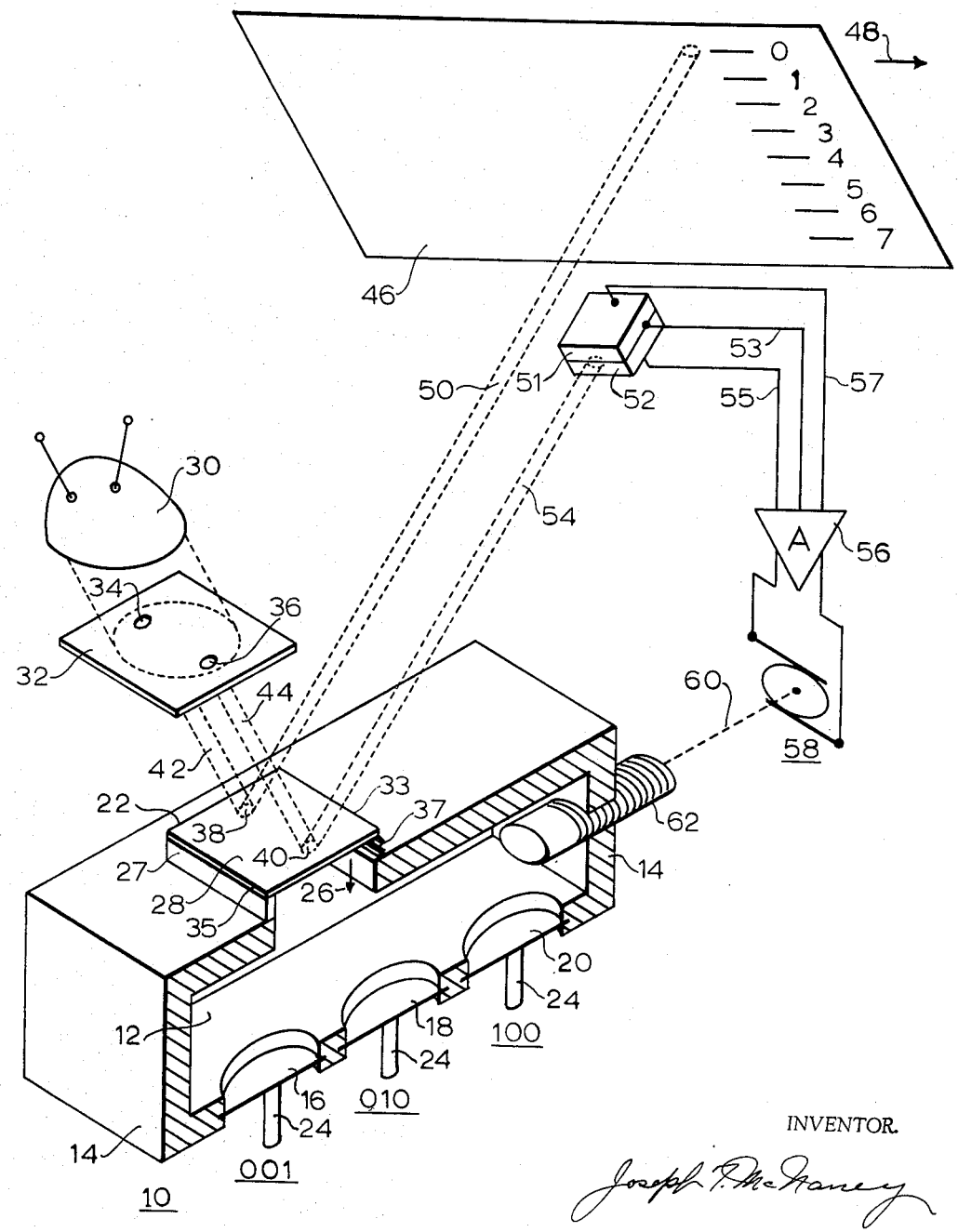

3,237,856
Patented Mar. 1, 1966

3,237,856
TEMPERATURE COMPENSATING MEANS FOR
FLUID DISPLACEMENT DECODER
Joseph T. McNaney, 8548 Boulder Drive,
La Mesa, Calif.
Filed May 27, 1964, Ser. No. 370,487
3 Claims. (Cl. 235—200)

This invention relates to an improvement in fluid displacement decoder mechanisms of the type described in my U.S. Patent No. 3,121,867, and particularly in means for compensating for variations in the expansion and contraction of the fluid due to changes in the temperature of the fluid.

In the aforementioned Patent 3,121,867, I utilize in a sealed envelopment a predetermined containment of fluid as the means for interconnecting a set of code related fluid displacement means and an output member, whereby, the output member will have imparted thereto a decimally related displacement, simultaneously, with the application of a set of code related functions to the set of displacement means.

Due to changes in the ambient temperature the fluid will either expand or contract as a function of such changes and this, of course, would cause corresponding errors in the position of the output member, unless, a predetermined fluid temperature is maintained, or, variations in fluid temperature are used to control the errors in the position of the output member.

It is an object of this invention, therefore, to regulate the capacity of the sealed envelopment, in which a predetermined amount of fluid is contained, as a function of fluid temperature.

Another object is to regulate the position of the output member, while in a reference position, as a function of fluid temperature.

A further object is to utilize an error in the reference position to compensate for volumetric variations in the containment of fluid.

Numerous other objects, of course, will appear hereinafter as a description of the invention proceeds.

The novel features that are considered characteristic of this invention are set forth with particularity in the appended claims. The invention itself, both as to its organization and method of operation, as well as additional objects and advantages, will best be understood from the following description when read in connection with the accompanying drawing which shows a partially sectional and diagrammatic illustration of a system embodiment of the invention.

Referring now to the drawing, a fluid displacement mechanism 10 is shown which includes a space 12 within a hermetically sealed envelopment 14. The envelopment 14, partially sectional, also includes a set of fluid displacement members, or diaphragms, 16, 18 and 20, and an output member, or fluid displacement responsive member, 22. The envelopment 14 is of rigid construction and therefore designed to resist any form of distortion to its original configuration as a result of forces from within, and also from without. The space 12 is filled with a fixed amount of fluid, such as petroleum base, or synthetic, hydraulic fluids. Such fluid, therefore, will be designed to link together all of the displacement members 16, 18 and 20, and the output member 22, so that any movement imparted to one or more of the displacement members will result in a corresponding displacement of the output member 22.

Each of the members 16, 18 and 20 is provided with a plunger means 24, which may be the plunger of the actuator means shown and described in the above Patent No. 3,121,867, and wherein respective actuator means are electrically coupled to a set of binary code related input information. For example, fluid displacements from members 16, 18 and 20 will correspond, respectively, to binary codes 001, 010 and 100.

Relative area dimensions and travel distances of the fluid displacement members 16, 18 and 20 will serve as the means for deriving fluid displacements substantially proportional to the value of binary code related input functions to their respective plunger means 24. Fluid displacements such as this are then imparted to the fluid displacement responsive member 22, and in the direction of the arrow 26. Utilization of member 22 displacements is illustrated, for example, as a light beam reflector, and for this reason the surface 28 is provided with a mirror like surface for the reflection of light incident thereto.

A light source 30 is shown in combination with a mask 32, which is provided with first and second light apertures, 34 and 36, for limiting the exposure of first and second spots of light, 38 and 40, on the reflecting surface 28, and obtained, respectively, from first and second light beams 42 and 44. The first light beam 42 is being illustrated, by way of an example, in combination with the reflector 28 and a light responsive record medium 46, as a means of utilizing the invention as a recorder of decoded binary code related input functions. The second light beam 44, and the utilization thereof, will be described in connection with the fluid temperature compensating means of this invention.

The recorder portion of the system includes a record medium 46 which will be allowed to move in the direction of the arrow 48 while the reflected beam 50 is being scanned back and forth across the record medium 46 in response to the code related input functions. However, under zero signal input conditions a predetermined output member 22 position will allow the reflected beam 50 to coincide with a zero reference position, as indicated by the 0 through 7 scale on the medium 46. Under these conditions the member 22 may be referred to as being in a first static position coincident with a first static fluid condition.

The fluid temperature compensating means includes the use of a first and second photoelectric means 51 and 52, supported in the path of a reflected light beam 54, and closely adjacent to one another so that equal portions of the beam 54 will be exposed simultaneously to the first and second photoelectric means 51 and 52. The electrical output of the respective photoelectric means is coupled through an amplifier 56 to an electric motor 58, which is linked through appropriate gearing 60 to a fluid temperature responsive fluid displacement control member 62. This latter member 62 is illustrated, for example, as being a threaded rod-like member, supported in the envelopment structure 14 by means of the threads thereon so that it can be made to screw in or out of the space 12 of the envelopment 14.

Under normal operating conditions the initial adjustments will be as follows: (a) the input to the displacement members 16, 18 and 20 will be zero; (b) the light reflector 28 and the member 22 associated therewith will be made to assume a first static position; (c) the light beam 50 being reflected from the reflector 28 will assume a zero reference position; (d) the fluid within the space 12 of the envelopment will be supported in a first static condition; and (e) the light beam 54 being reflected from the reflector 28 will be sensed equally by the first and second photoelectric means 51 and 52. Assuming the temperature of the fluid is stationary, then the temperature compensating means will likewise be stationary. When, for example, the temperature of the fluid increases the fluid will expand, causing the end 33 of the member 22, adjacent the bellows 37, to rise in relation to the end 35, which is attached to a fixed support 27. The light beam 54 will be deflected upward and away from a zero reference position causing the photoelectric means 51 to sense a larger portion of the beam 54 than the photoelectric means 52. A resulting difference current through circuits 55 and 57 to the amplifier 56 will cause the motor 58 to turn the control member 62 in a direction necessary to screw it out of the space 12 in which the fluid is contained. This turning of the control member 62 will continue until the light beam 54 is again sensed equally by the photoelectric means 51 and 52, and at which time the output member 22 will have been returned to its original first static position, or zero reference position.

When, for example, the temperature of the fluid decreases it will contract. This would be followed by a member 22 movement whereby the beam 54 would be deflected downward and away from the zero reference position causing the photoelectric means 52 to sense a larger portion of the beam 54. A resulting difference current from the respective means 51 and 52 will cause the control member 62 to be turned in the direction necessary to screw it into and against the fluid in the envelopment 14, thereby, returning the output member 22 to its original first static position.

When responding to a set of input functions, the light beam 54 of the invention will be deflected downward sufficiently to avoid any exposure of the beam 54 to photoelectric means 51 and 52. The temperature compensating means will, therefore, be inactive. However, upon the removal of input functions and the return of the fluid from a second static condition to a first static condition the temperature compensating means of the invention will again sense any expansion or contraction of the fluid and compensate for it in the manner hereinbefore described. The invention, therefore, and as illustrated, will respond to volumetric variations in the fluid only so long as the fluid is in what has been termed as a first static condition, or, a primary static condition. The invention, of course, is not necessarily limited in this regard. It should be noted that the second static condition of the fluid, being referred to in the above description of the invention, is intended to mean a static condition of the fluid following any given set of input functions. The placement of the photoelectric means 51 and 52 in the system could be made to coincide with any of the 1 through 7 secondary static conditions, as indicated in the illustration, instead of the primary static condition. If, for example, the photoelectric means 51 and 52 were positioned so as to intercept the beam 54 only upon the application of input functions to input members 16, 18 and 20, then the temperature compensating means of the invention would function only under such input conditions.

Another alternative, which should be taken into consideration insofar as this invention is concerned, is to provide two or more such photoelectric means 51 and 52, connected in parallel, and made to coincide with two or more of the secondary static conditions 1 through 7.

Although I have hereinbefore referred generally to photoelectric means 51 and 52, such means may be of the photovoltaic or the photoconductive, many types of which are well known in the arts. However, the types ideally suited in connection with the present invention are disclosed in my U.S. Patents 3,050,623 and 3,106,692.

The particular embodiments of the invention illustrated and described herein are illustrative only, and the invention includes such other modifications and equivalents as may readily appear to those skilled in the arts, and within the scope of the appended claims.

I claim:
1. Means for utilization in a fluid displacement light beam position recording apparatus including:
    (a) a sealed envelopment of fluid having an output member, first input means for adjusting said fluid to a predetermined static condition and for adjusting said member to a reference position, and second input means for changing said condition of the fluid and the position of said member in relation to said reference position;
    (b) first and second light beams directed along first and second paths;
    (c) first and second light responsive means supported, respectively, in said paths of the first and second light beams;
    (d) light reflector means, associated with said output member, for intercepting and changing the paths of said first and second light beams in response to a change in said predetermined static condition; and
    (e) said second light responsive means making a record of said change in the predetermined static condition, and said first light responsive means controlling said adjusting of the fluid by said first input means prior to making said record of the change in the predetermined static condition.

2. The invention as set forth in claim 1 additionally including:
    (f) said second input means being a set of binary code related fluid displacement members with means for applying a set of binary code related functions thereto.

3. The invention as set forth in claim 1 additionally including:
    (f) said first light responsive means being in the path of said first light beam only as long as said output member is in said reference position.

References Cited by the Examiner

UNITED STATES PATENTS

| | | | |
|---|---|---|---|
| 653,881 | 7/1900 | Pollak | 346—109 X |
| 2,077,962 | 4/1937 | Smith | 235—200 X |
| 2,906,095 | 9/1959 | Whitehead | 73—393 X |
| 2,941,404 | 6/1960 | Woods | 137—79 X |
| 3,037,423 | 6/1962 | Shurcliff | 88—26 |
| 3,057,185 | 9/1962 | Van Howe et al. | 73—37 |

FOREIGN PATENTS

| | | |
|---|---|---|
| 589,389 | 5/1925 | France. |
| 291,841 | 6/1928 | Great Britain. |
| 120,685 | 1959 | Russia. |

LEO SMILOW, *Primary Examiner.*